F. L. O. WADSWORTH.
GLASS WORKING APPARATUS AND PROCESS.
APPLICATION FILED APR. 24, 1914.
1,311,474.
Patented July 29, 1919.
2 SHEETS—SHEET 1.
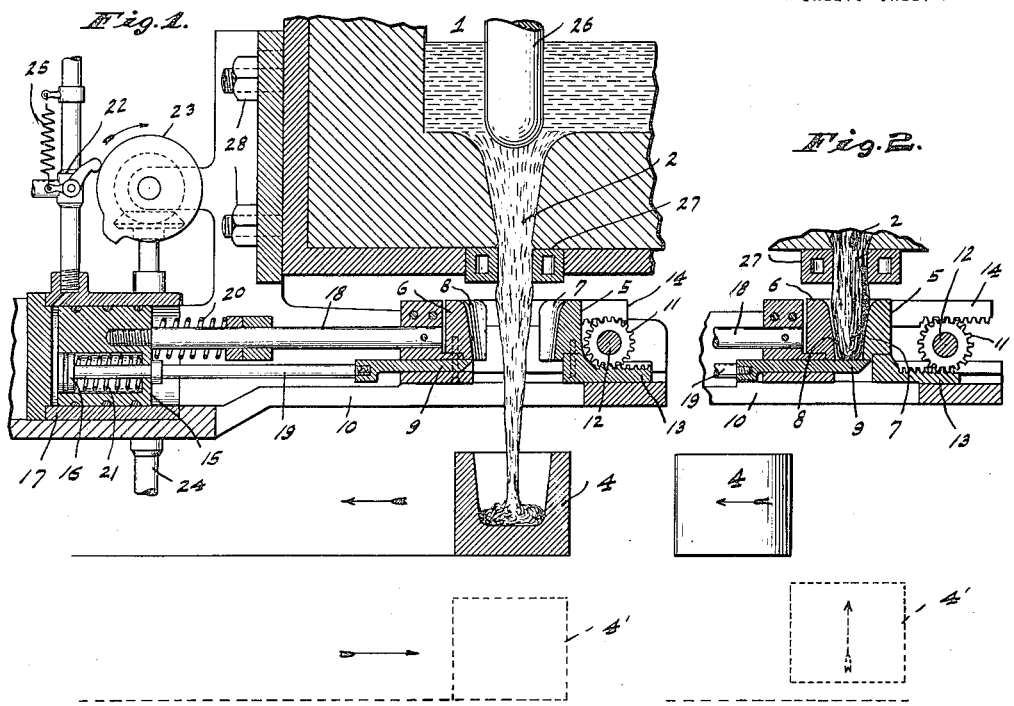
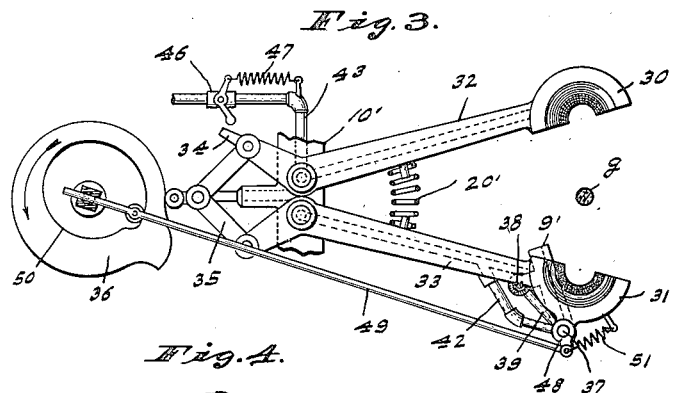
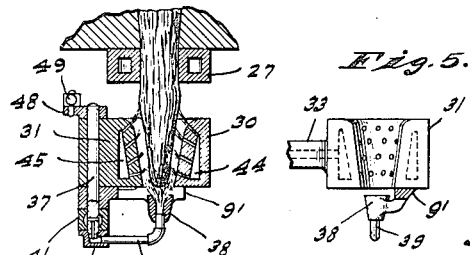
WITNESSES
INVENTOR
Frank L. O. Wadsworth,
ATTORNEY.

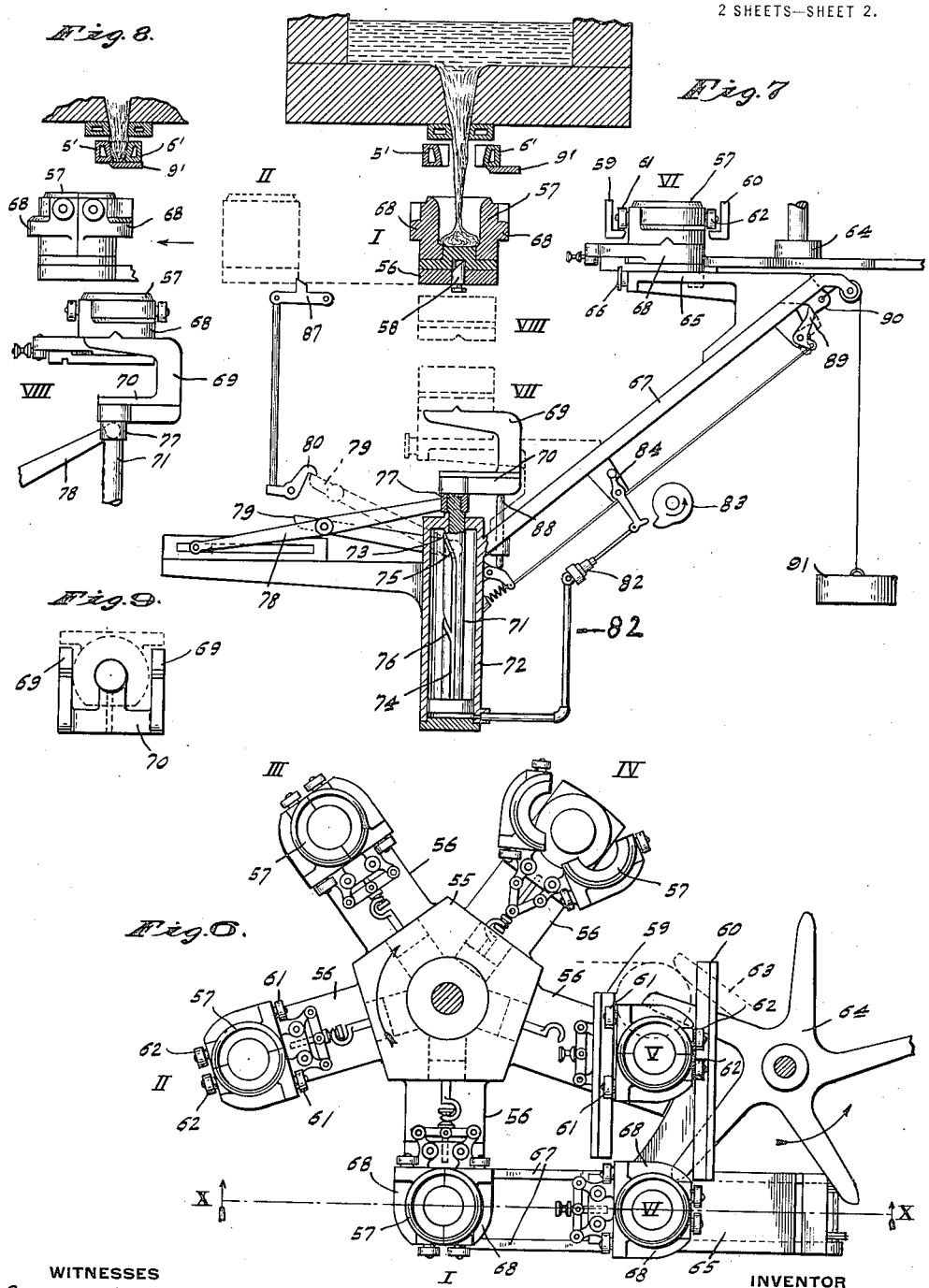

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

GLASS-WORKING APPARATUS AND PROCESS.

1,311,474.  Specification of Letters Patent.  Patented July 29, 1919.

Application filed April 24, 1914. Serial No. 834,230.

*To all whom it may concern:*

Be it known that I, FRANK L. O. WADSWORTH, a citizen of the United States, residing at Pittsburgh, in the county of Allegheny and State of Pennsylvania, have invented a new and useful Glass-Working Apparatus and Process, of which the following is a specification.

My invention relates generally to improvements in the art of automatically charging a series of molds or forming receptacles with predetermined quantities of molten glass delivered thereto directly from a melting furnace or other large source of supply. The invention relates more specifically to the automatic charging of such molds by means of a flowing stream of glass which is allowed to pass directly from the furnace to the receptacle until the required quantity has been delivered, and is then, for a short time, arrested in its flow in such manner as to entirely prevent any piling up or lapping of the arrested stream or the entraining of air or gas bubbles therein.

When a stream of glass or other similar thermoplastic material is delivered from a source of supply, especially when that delivery takes place through a downwardly presented opening or orifice, there is a surface chilling of the stream throughout its entire length, this surface chilling resulting, immediately adjacent and below the discharge orifice in a conical shell, the base of which, immediately adjacent the orifice, is of appreciable thickness and of considerably less plasticity than the interior of the stream, the thickness and character of this shell depending very largely, of course, upon the character of the glass, its initial temperature as it emerges from the furnace, and the atmospheric temperature. Through this tubular shell the main body of the stream of glass flows, the downward velocity of the middle of the stream being greater than the exterior. I have discovered that when a stream of glass is severed, as above described, at a point fairly close to the delivery orifice, the momentary chilling at the cutting plane results in the completion of an inclosing stream-retarding envelop for the depending end of the stream, the slight chilling resulting from the cutting operation connecting up with the chilled skin or shell which is depending from the discharge orifice. The exact distance of the cutting plane from the orifice will, of course, depend upon the size of the stream, its consistency, temperature and consistency of the inclosing shell.

In general, I have found that the plane of cutting should be located at a distance below the orifice 2 which is approximately equal to the diameter of the said orifice, but this distance, as already stated, can be varied to a considerable degree according to the temperature of the material. When cut at too high a point, the glass drop or globule depending from the orifice will not contain a sufficient mass of molten metal to overcome the surface tension and viscosity of the material, and the flow will not be properly reestablished after the severing operation. When cut at too low a point the mass of depending material will be too great and the downward flow will be resumed before a sufficient interval has elapsed for the removal of the filled mold and the bringing of an empty mold—such as 34—to the required charging position. But by adjusting the plane of the cut by the upward or downward movement of the apparatus a point can be always found where the physical causes tending to control the resumption of the flow of the severed stream will so coöperate as to support the globular mass depending from the orifice 2 for a sufficient length of time to permit of the necessary mold movements, and will then allow the stream to resume its flow to the next mold.

The method by which I secure the last described result consists essentially in severing the flowing stream at a point near the orifice or opening from which it emerges; then immediately subjecting both the severed end and the adjacent sides of the stream to a momentary surface chilling action whereby the downward flow of the molten material is stopped by the joint effect of the said surface chilling; and then removing the chilling means allowing the internal heat of the metal to remelt or resoften the chilled skin so that a downward flow will be reëstablished. The chilling may be accompanied by pressure on the plastic glass, if desired. The mechanical means by which this process may be carried out are varied, and the practice of the method depends not on the use of any particular form of mechanism but on the utilization of the characteristic properties of molten glass at its normal working temperature.

In the drawings, Figure 1 illustrates in partial sectional elevation one form of mechanism suitable for the practice of my invention; Fig. 2 is a similar view showing the stream arresting parts in closed position; Fig. 3 is a plan view of a second form of apparatus adapted to carry out my improved method; Figs. 4 and 5 are detail sectional views of the stream arresting parts of the second form of apparatus when it is in its closed position; Fig. 6 is a partial plan view of a mold table mechanism suitable for use with my improved stream arresting device; Fig. 7 is a partial sectional elevation, of a more or less diagrammatic character, taken on the line X—X of Fig. 6; Fig. 8 is a detail view of a portion of the apparatus at the time the movement of the stream is arrested; and Fig. 9 is a plan view of a part of the mechanism shown in Fig. 8.

In Fig. 1, which shows one form of apparatus convenient for carrying out my improved method, 1 indicates a flow block chamber or dog house extension communicating with a melting tank or other large supply receptacle containing the molten glass; and which is provided in its bottom with an orifice 2 through which the stream of molten material flows downwardly to the series of molds 4, 4', as they are brought successively to the charging position in a manner later to be described. Just below the orifice 2 I place the stream-severing and stream-arresting device, which, in the present instance, consists essentially of two reciprocating blocks 5 and 6 and a shear blade 9. The blocks 5 and 6 are provided on their adjacent surfaces with coned cavities 7 and 8 so shaped that when the blocks are brought together, as shown in Fig. 2, the sides of these cavities make contact with the sides of the glass stream, issuing from the orifice 2, and limit the enlargement of that stream when its flow is arrested. The lower ends of these cavities 7 and 8 are coned at a less angle than the upper portions thereof so that when the blocks are brought together as just indicated the lower end of the stream will not be caught between the sides of the blocks and the latter prevented from closing. The final and complete closure of the opening, which effects the severance of the stream of glass, is effected by the reciprocating shear blade 9 which has a motion independent of that of the block 6.

The blocks 5 and 6 are each slidably supported on a frame 10, and are connected together in such manner as to be moved simultaneously and equally in opposite directions by the action of idle pinions 11 mounted on a fixed shaft 12 and engaging with racks 13 and 14 attached respectively to the blocks 5 and 6.

Motion is imparted to the blocks, and to the shear blade 9, by the action of pistons 15 and 16 in the cylinder 17. The main piston 15 is coupled directly to the support of the block 6 by the rod 18, while the auxiliary piston 16, which is slidably mounted in the main piston 15, is independently connected to the shear blade 9 by the piston rod 19. Both pistons are normally held in their retracted position in the cylinder by springs 20 and 21. The flow of the actuating fluid, compressed air or steam for example, to the cylinder 17 is controlled by a three-way valve 22, the stem of which is moved by the joint action of a constantly rotating cam 23 (coupled to the main driving shaft of the mold carrying [not shown] machine by a shaft 24) and spring 25.

The molds 4, 4' which are to be successively supplied with molten material, may be brought one after the other to the charging position below the orifice 2 in any approved manner. In order to diminish the time required to bring the molds in succession to the charging position, which corresponds approximately to the time during which the flow of the glass stream must be arrested, I prefer to employ mold actuating mechanism of such character that the empty receptacles are brought in turn directly under the charging position, as indicated in dotted lines in Fig. 1, and are then raised vertically to said charging position while the filled mold is being moved laterally to one side (see Fig. 2). The more complete description of one form of apparatus for effecting such a movement of the molds will be found below.

The operation of the device illustrated in Figs. 1 and 2 is as follows: With a mold in the charging position indicated in full lines in Fig. 1, the stream of glass is allowed to flow directly downward from the orifice 2 into a receptacle until a sufficient quantity has accumulated therein for the formation of the desired article. The stem of the three-way valve 22 is then actuated by the raised portion of the cam 23 thereby admitting compressed air (or steam or other actuating fluid) to the cylinder 17 and moving the main piston 15 to the right against the pressure of the spring 20. This movement of the piston communicates in turn an equal and opposite movement to the two blocks 5 and 6 (through the medium of the connecting rod 18 and the rack and pinion coupling 11—13—14) thereby bringing these blocks to the closed position of Fig.

2. As soon as these blocks make contact with each other the motion of the main piston 15 is arrested, and the secondary piston 16 is then further forced forward against the pressure of the spring 21, thus carrying the shear blade 9 across the opening at the bottom of the blocks and completely severing the stream of glass.

As promptly as possible, in synchronism with the movement of the blocks 5 and 6 and shear 9, the mold 4 in the charging position is moved to one side, as indicated in full lines in Fig. 2, and as soon as this mold has moved but little more than one-half its diameter, the mold 4' which is already in the flow line, just below this initial position, is moved upward toward the charging position, as indicated in dotted lines in the same figure. As the mold 4 is being withdrawn from the flow line, the stem of the valve 22 is released from the cam 23, and the valve is carried to its open position by the spring 25 thereby releasing the pressure in the cylinder 17 and permitting the parts of the severing and stream supporting device to return to their open position (as shown in Fig. 1) under the successive action of the springs 21 and 20.

During the time that the blocks have been held in the closed position of Fig. 2, the sides and ends of the stream have been slightly chilled by contact with the surfaces of the blocks, and when the blocks are open the chilled skin so formed on the glass will itself momentarily support the stream. The internal heat of the body of the suspended molten mass will however almost immediately remelt or resoften this chilled skin, and the stream will then resume its downward flow to the next mold which has by this time been brought to the charging position. The blocks and shear can be withdrawn from the stream quite promptly, the time of withdrawal being so gaged that the new stream will just miss the mold 4 as it is being withdrawn.

All lapping or piling up of the stream during the time that the blocks 5 and 6 are in their closed relationship is prevented by the supporting action of said blocks both on the severed end and on the sides of the stream, and any "laps" in the glass or any entraining of air bubbles therein is thus entirely avoided and prevented. When the blocks are opened and the stream of glass resumes its flow, after its chilled surface has been removed by the action of the internal heat of the mass, the material therefore passes downward to the next mold in practically the same condition as it emerges from the orifice 2.

In order to prevent too great a chilling action on the end and sides of the severed and arrested stream, with the consequent formation of too thick a surface skin of cooled and stiffened glass, I prefer to make the blocks 5 and 6 of some material which has the wear-resisting qualities of metal, and which has at the same time a relatively low heat conducting capacity. Manganese steel is one such a material, and compressed carborundum is another. Under certain conditions I may also use other non-metallic materials which have the above described characteristics. In order to permit of the ready replacement of these blocks, either because of wear or for other reasons, they can be made separate from the supports which slide on the ways of the frame 10 and which carry also the shear blade 9 and the synchronizing device 11—13—14.

In order to change the volume of flow of the stream, I provide a vertically movable plug 26; and I also place below the orifice 2 a water-cooled ring 27, whose temperature can be varied, and the viscosity and velocity of outflow of the glass through said ring thereby adjusted to a considerable extent. As the velocity of outflow is changed the size of the stream below the orifice will also change, and in order to adjust the apparatus so that the stream when severed will always be supported on its side by the blocks, I arrange the support of the entire frame 10, which carries the various parts of the cut off device, so that it can be adjusted vertically up and down and clamped in any desired position, as by the bolts 28—28 for example. To take care of very large variations in the flow, I change both the ring 27 and the blocks 5 and 6.

In Figs. 3, 4 and 5 I illustrate another form of mechanism for effecting the severance of the glass stream and the support thereof during the interval required for changing the positions of the molds. In the construction now to be described, the blocks 30 and 31, which embrace the sides of the stream during the arrest of its flow, are mounted on the ends of arms 32 and 33, that are pivoted on the frame of the machine (a portion only of this frame being indicated at 10') and are moved simultaneously and synchronously by the toggle joint links 34 and 35, the latter being actuated in turn by the joint action of the cam 36 and spring 20'.

Mounted in the block 31 is a shaft 37 which carries at its lower end a shear blade 9' and a conical nozzle 38 that is connected by a pipe 39 to a cap 40 on the end of the shaft 37. The cap 40 communicates through an opening in the shaft 37 with the interior of a loose coupling sleeve 41, attached to the end of a pipe 42. The lower ends of the shafts carrying the arms 32 and 33 are provided with similar sleeves which are connected to the pipe 43; and openings from these sleeves lead upward through the said shafts and out through the said arms (see dotted lines in Figs. 3 and 5) to communicate with cavities 44 and 45 in the blocks 30 and 31; the passageway in the arm 33 being also in communication with the pipe 42. The pipe 43 is connected to a source of compressed air or steam, the flow of which is controlled by a valve 46 which is normally held closed by a spring 47.

The shear blade 9' with its attached parts, is operated independently of the block 31 by means of a crank arm 48 and a connecting rod 49 which is moved longitudinally by the joint action of a cam 50 and a spring 51.

The operation of this second form of cut-off and stream-chilling mechanism is as follows: The cam 36, like the cam 23, is revolved constantly by a connection with the power shaft of the machine (not shown) at such speed that it makes one complete rotation for each complete cycle of operations, i. e., in the time required to charge one mold, remove it and bring another mold to stream-receiving position. At the instant the charging of one receptacle is complete, the raised portion of the cam 36 makes contact with the slide which actuates the links 34 and 35 and brings the blocks 30 and 31 together. Simultaneously with the closing of the blocks the cam 50 actuates the connecting rod 49 and crank arm 48 to swing the shear blade 9' across the lower face of the closed blocks and thus sever the flowing stream of glass g. This brings the parts into the position shown in Figs. 4 and 5, with the nozzle 38 directly under the freshly severed end of the glass stream. At the instant of closing of the blocks 30 and 31 the valve 46 is opened, by the end of the link arm 34, admitting compressed air or steam to the cavities 44 and 45 in the blocks 30 and 31 and also admitting the fluid to the nozzle 38. This air or steam escapes from the perforations in the inner faces of the blocks 30 and 31 (see Fig. 4), in a series of overlapping and commingling jets which impinge on the sides of the glass stream, and is also discharged in an upwardly directed jet from the nozzle 38 against the freshly severed end of that stream. The impingement of these relatively cool streams of fluid against the surface of the molten glass chills the surface of the latter; and this surface chilling, combined with the effect of the pressure exerted by the jets against both the end and the sides of the stream, momentarily arrests the flow of said stream while the filled mold is being removed and the next empty mold brought to receiving position. Just before the mold movement is completed the slide of the link mechanism is released from engagement with the elevated portion of the cam track 36 and the blocks are moved back to their open position by the spring 20'. During this movement the shear blade 9' and nozzle 38 are still retained by the cam 50 in the position of Fig. 5 with reference to the block 31; and are only allowed to return to their initial position, as shown in Fig. 3, after the opening of the blocks has been completed. The air (or steam) is shut off from the pipe 43, as soon as the blocks begin to open, by the action of the spring 47. The removal of the chilling and supporting effects of the fluid jets impinging on the surface of the glass permits the chilled surface skin of the arrested stream to be resoftened by the internal heat of the molten material, and permits the stream to resume its flow to the next mold.

As has already been indicated, it is always desirable to make the interval, during which the flow of the stream must be arrested, as short as possible. This can be best done by bringing each mold to be filled to a position directly under the charging position, where a mold is being filled, so that when the latter is charged and moved to one side by approximately only one-half of its own diameter the next mold is already in position to receive the stream when it resumes its downward flow.

In Figs. 6, 7, 8 and 9 I have shown, partly in diagram only, one form of apparatus by which the above mentioned movement of the molds may be secured. In the construction there shown or indicated 55 is a rotary mold table provided with five arms 56, 56, etc., each of which carries a mold 57, 57, of the form required for the production of any desired article. This mold table is rotated intermittently through one-fifth of a revolution (by any approved form of mechanism for that purpose) so as to carry the molds successively from the charging position 1 to, and through, the following positions II, III, and IV. The molds are held in proper position on the arms 56, during these movements, by spring latches or pins 58. At its right hand side the machine is provided with two fixed L-shaped tracks 59 and 60 so positioned as to engage rollers 61, 61, and 62, 62, on each mold as the latter is carried through the point 90° back of the charging position in the movement of the arms 56 from position IV to position V. At the instant of passing this 90° point, the catch 58 is retracted, by means not shown, and the side of the mold is simultaneously engaged by an arm 63 of the star wheel 64, which is geared to, and moves in synchronism with, the mold table or carriage 55. Under the joint driving effect of this star wheel arm 63 and the frictional driving effect of the table arm 56 the mold is moved along the tracks 59 and 60 until it reaches the position V where the mechanism temporarily comes to rest. At the next movement of the parts the mold in position V is carried along the tracks 59 and 60 and pushed from the outer ends of the latter onto a table 65, to position VI. In order to facilitate this movement, the table 65 may be provided with rollers 66 the flanges of which enter grooves on the bottom plates of the molds 57. The table 65 is mounted on inclined tracks 67, which carry it from the full line position of Fig. 7 to the dotted line position on that same figure, and in this movement bring the mold from position VI to position VII. In this last position, the flanges 68, 68 on the sides of the mold are engaged by the arms 69, 69 (see best Fig. 9) of the forked head 70 which is mounted on the upper end of a plunger 71 in the cylinder 72. This plunger is provided with two longitudinal grooves 73 and 74, 90° apart, and connected together at the two ends of the grooves 73 by the spiral grooves 75 and 76. The upper end of the plunger 71 is also provided with a sleeve collar 77 which is pivoted to the long arm 78 of an ordinary two-arm straight line linkage, whose purpose is to guide the upper end of the plunger in line with the bore of the cylinder 72. The short arm 79 of this linkage is extended to form a dog which will engage with the lock 80 when the plunger has been raised to the position shown in Fig. 8, and will hold it in that position against the pressure of the actuating fluid on the lower side of the plunger piston. The compressed air or steam used to operate the plunger is introduced at the lower end of the cylinder through a pipe 81 containing a three-way plunger valve 82, the stem of which is jointly actuated by a cam 83 and a lever 84 in the manner presently to be described.

The operation of the above described apparatus is as follows: The mold at charging position 1 is left in that position until the required quantity of glass has accumulated therein. The blocks 5' and 6' and shear blade 9' are then operated to sever and support the stream as shown in Fig. 8. Simultaneously with the severing of the stream the mold table is set in motion carrying the mold at charging position 1 to the left toward position 11 as shown in Fig. 8. While the mold in the charging position is being filled, an empty mold has been brought to the position VIII (shown in dotted lines in Fig. 7 and in full lines in Fig. 8) in the manner later to be described; and is held there by the pressure of air in the cylinder 72 and the lock 80. As soon as the mold has moved far enough from position 1 to clear the lower mold, the arm 56 which carries it is engaged with the dog 87 thereby releasing the lock 80 and allowing the plunger to rise to the top of its stroke. As the plunger rises, it, together with the head 70 and the mold carried thereby, is revolved through 90° by the engagement of the lower spiral groove 76 with the guide key in the upper cylinder head. This brings the mold into the position indicated at 1 in Figs. 6 and 7. It is held in this position on the plunger head until the empty arm of the mold table advancing from position V has come to rest under it. The three-way valve 82 is then opened to the atmosphere by the cam 83 and the air in the cylinder 72 is allowed to escape permitting the head 70 and plunger 71 to descend to their lowest position, as shown in Fig. 7. As the plunger descends, it is rotated back 90° to its original position by the action of the upper spiral groove 75. At the lowest point of its stroke, the head 70 strikes the head of a pin 88, which in turn releases the catch 89, which holds the carriage 65 at the top of the inclined track 67. The release of this catch permits the carriage 65, together with the mold which has just before been pushed upon it by the action of the star wheel arm 63, to slide down the tracks 67 and thus carry the mold from position VI to position VII where it is supported by its side flanges 68 on the arms 69 of the head 70. At the lower end of its movement, the lug 90 on the carriage 65 engages with the upper end of the valve lever 84 and opens the pipe 81 to the compressed air supply. This causes the plunger 71 and head 70 to rise until the upward motion is arrested by the lock 80, thus bringing the mold next to be filled to the position previously described. As the head 70 rises and lifts the mold from the carriage 65, the latter is permitted to slip out from between the forks 69, 69 and return to its upper position (under the action of the counterweight 91) where it is once more engaged and held by the dog 89. It is then in position to receive the next mold which is brought to it from position V by the next successive movement of the mold table and star wheel 64, in the manner already described.

I do not here claim the particular mode of mold operation by which each mold is brought to the charging position by moving it under the mold being filled and then when the latter is charged, lifting it vertically while the filled mold is moved laterally, as that forms the subject of a separate application.

It should be understood that while in the drawings I have shown the stream of glass accumulating in the mold, this condition is a function of time of flow and positioning of the mold in the line of flow and that if the cutting operations are sufficiently close together, the separated glass mass will be in the form of a column or gob and that by properly proportioning the size of the orifice relative to the size of the mold or receptacle, the length of the stream cut away from the oncoming glass may be comparatively short and much less than the distance between the orifice and the mold; all this without in any way departing from my invention.

I claim as my invention:

1. That improvement in the art of glass working, which comprises the establishment of a downwardly flowing stream of glass from a source of supply into a receptacle, the cutting of said stream at a point below but closely adjacent the upper end of said stream, the application to said freshly produced end of a stream-embracing cooling element serving to produce, below but in conjunction with the chilled skin depending from the orifice, a temporarily chilled stream-supporting envelop for said freshly-produced end immediately preceding a cutting, and the withdrawal of the filled receptacle and presentation of a receptacle in the stream line.

2. That improvement in the art of glass working, which comprises the establishment of a downwardly flowing stream of glass from a source of supply, the cutting of said stream below but adjacent the upper end of the stream, and the temporary application to said stream adjacent its upper end of a stream embracing and chilling member to temporarily produce, below but in conjunction with the chilled skin depending from the orifice a stream-retarding envelop for said stream immediately preceding a cutting.

3. That improvement in the art of glass working, which comprises the establishment of a stream of glass normally flowing from a source of supply, the cutting of said stream adjacent the source so as to leave an exposed portion of the stream, and the temporary application to said exposed portion of a stream embracing chilling member serving to produce, below but in conjunction with the chilled skin depending from the orifice a flow-retarding temporarily-chilled envelop for said exposed stream portion immediately preceding a cutting.

4. A glass working machine comprising, cutting mechanism, and superposed stream-embracing members relatively movable to momentarily symmetrically embrace a stream of glass to form a temporarily-chilled flow-retarding envelop for the stream without materially swelling, and to thereafter cut the same below the embracing means.

5. In glass working apparatus, the combination with means to establish a stream of glass flowing from a source of supply, of a pair of stream-embracing chilling-members arranged adjacent said stream at its emanation in position to form a temporarily-chilled flow-retarding symmetrical envelop for the stream as the stream is severed, means for shifting said stream-embracing members toward and from the stream line, a cutting member arranged beyond the stream-embracing members, and means for operating said cutting member in synchronism with the stream embracing means to intermittently sever the glass stream.

6. In glass working apparatus, the combination with means to establish a stream of glass flowing from a source of supply, of a pair of stream-embracing chilling members arranged adjacent said stream at its emanation in position to form a temporarily-chilled flow-retarding symmetrical envelop for the stream as the stream is severed, means for shifting said stream-embracing members toward and from the stream line, a cutting member arranged beyond the stream-embracing members, and means for operating said cutting member to intermittently sever the glass stream.

7. In a glass working machine, the combination of a pair of stream-embracing members having an effective diameter substantially equal to the stream in the plane thereof, means for moving said embracing members toward and from an intermediate stream line, a shear blade carried by one of said members and coöperating with the other member, and means for moving said shear blade independently of the embracing member.

8. In a glass working machine, the combination with means for establishing a stream of glass flowing from a source of supply, a pair of stream-embracing members arranged upon opposite sides of said stream adjacent its source and having an effective diameter substantially equal to the stream in the plane thereof, means for moving said stream-embracing members toward and from the stream line, a shear blade carried by one of said embracing members and coöperating with the other, and means for shifting said shear blade independently of the stream-embracing members.

9. In a glass working machine, a stream-embracing member having an open bottom, a shear blade movable across said open bottom to shear a stream passing through said stream embracing member, a nozzle associated with said members and movable into alinement beneath the open bottom of the stream-embracing member subsequent to the traverse of the shear blade, and means for directing an upward blast of gas from said nozzle into the lower end of the stream-embracing member.

10. In an apparatus of the class described, a pair of relatively movable gathering elements, a severing element movably positioned beneath the gathering elements, a severing margin on one of said gathering elements, means for moving the gathering elements toward and away from each other, and means for moving the severing element in its one limit of travel beyond the said severing margin of the one gathering element and beyond the inner margin of the opposite gathering element in its other limit of movement.

11. In an apparatus of the class described, a pair of relatively movable gathering elements, a severing element movably positioned beneath the gathering elements, a severing margin on one of said gathering elements, means for moving the gathering elements toward and away from each other, means for moving the severing element in its one limit of travel beyond the said severing margin of the one gathering element and beyond the inner margin of the opposite gathering element in its other limit of movement, and means for holding the last-mentioned gathering element to its inner limit of movement during a part of the time occupied by the withdrawal of the said severing element.

In witness whereof I have hereunto set my hand at Pittsburgh, Pennsylvania, this 23d day of April, A. D. one thousand nine hundred and fourteen.

FRANK L. O. WADSWORTH.

Witnesses:
M. M. SCHINNELLER,
SUE B. FRITZ.